United States Patent [19]

Martinez

[11] Patent Number: 4,591,837
[45] Date of Patent: May 27, 1986

[54] HYDRAULIC FLUID LEAK WARNING APPARATUS

[76] Inventor: Donald G. Martinez, P.O. Box 584, Calistoga, Calif. 94515

[21] Appl. No.: 671,266

[22] Filed: Nov. 14, 1984

Related U.S. Application Data

[63] Continuation-in-part of Ser. No. 420,067, Sep. 20, 1982, abandoned.

[51] Int. Cl.⁴ .............................................. G08B 21/00
[52] U.S. Cl. .................................... 340/605; 73/302; 73/308; 340/60; 340/624
[58] Field of Search ................. 340/623, 624, 625, 59, 340/605, 60; 73/299, 302, 308, 313; 188/1.11; 56/11.9

[56] References Cited

U.S. PATENT DOCUMENTS

| | | | |
|---|---|---|---|
| 1,768,446 | 6/1930 | Gron | 340/624 |
| 2,253,260 | 8/1941 | Alcorn | 340/59 |
| 2,825,895 | 3/1958 | Malagarie | 340/59 |
| 3,576,959 | 5/1971 | Bogosoff | 340/623 X |
| 3,673,587 | 6/1972 | Baruch | 340/59 |
| 4,020,481 | 4/1977 | Nakagawa | 340/624 |
| 4,057,700 | 11/1977 | Nakashima | 340/624 X |

FOREIGN PATENT DOCUMENTS

315568  7/1929  United Kingdom ................. 340/59

Primary Examiner—James L. Rowland
Assistant Examiner—Daniel Myer
Attorney, Agent, or Firm—Townsend and Townsend

[57] ABSTRACT

Apparatus for warning of a leak in a hydraulic system. The warning apparatus includes a liquid level sensor, mounted above the hydraulic fluid reservoir, and a signal assembly. The sensor includes an expansion chamber with a float chamber pipe inside. The float chamber pipe opens into the expansion chamber a substantial distance above the expansion chamber bottom. Hydraulic fluid, which expands when the equipment is started, flows through the open pipe end and into the expansion chamber. If the liquid level in the float chamber pipe drops below a set level, a float in the pipe also drops to activate the signal assembly. If the hydraulic system springs a leak, the alarm activates to minimize damage. Before re-starting the equipment the excess fluid held in the expansion chamber is allowed to drain back into the reservoir. Drainback is done either passively, through a constricting passageway at the expansion chamber bottom, or actively, typically by the operator after use.

15 Claims, 4 Drawing Figures

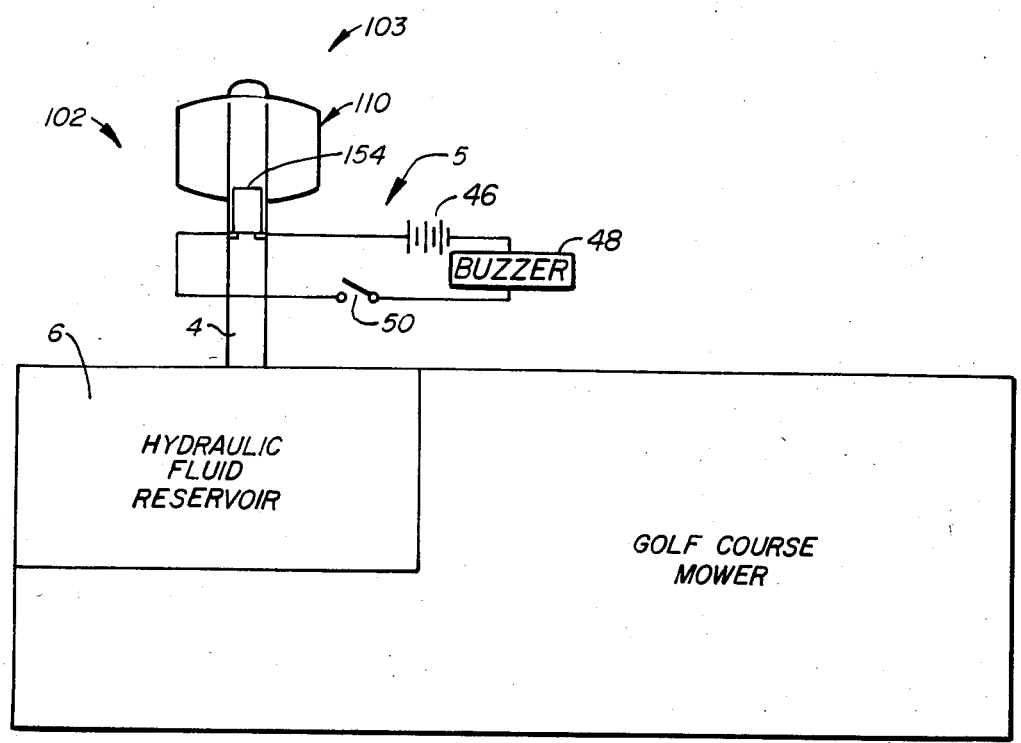
FIG.__3.
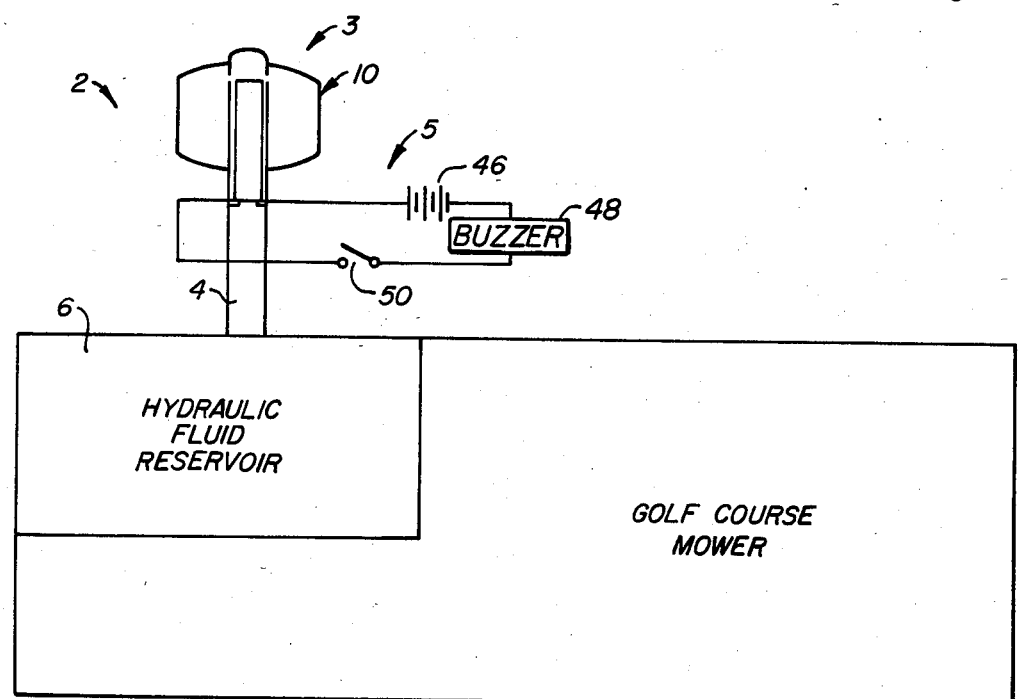
FIG.__1.

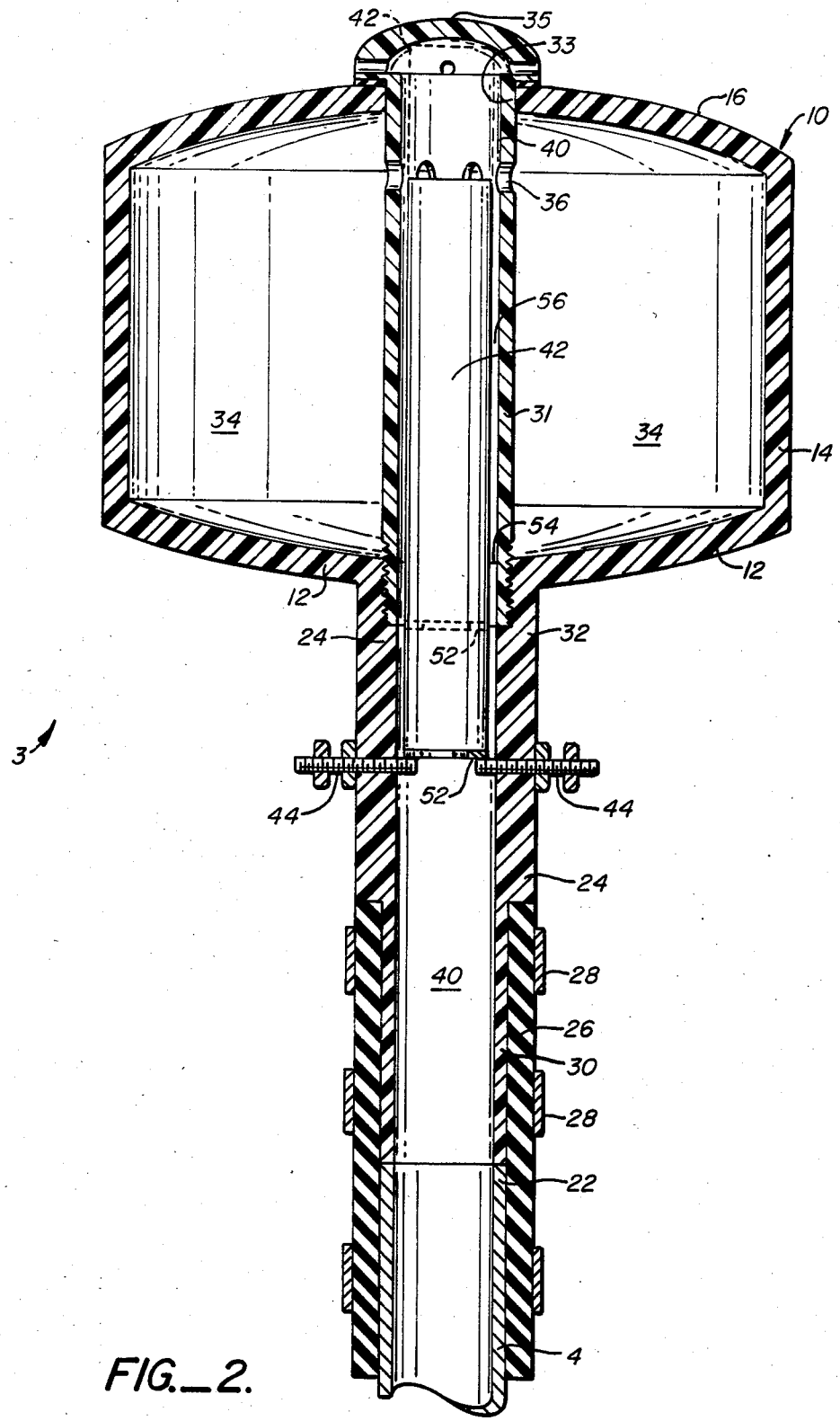
FIG._2.

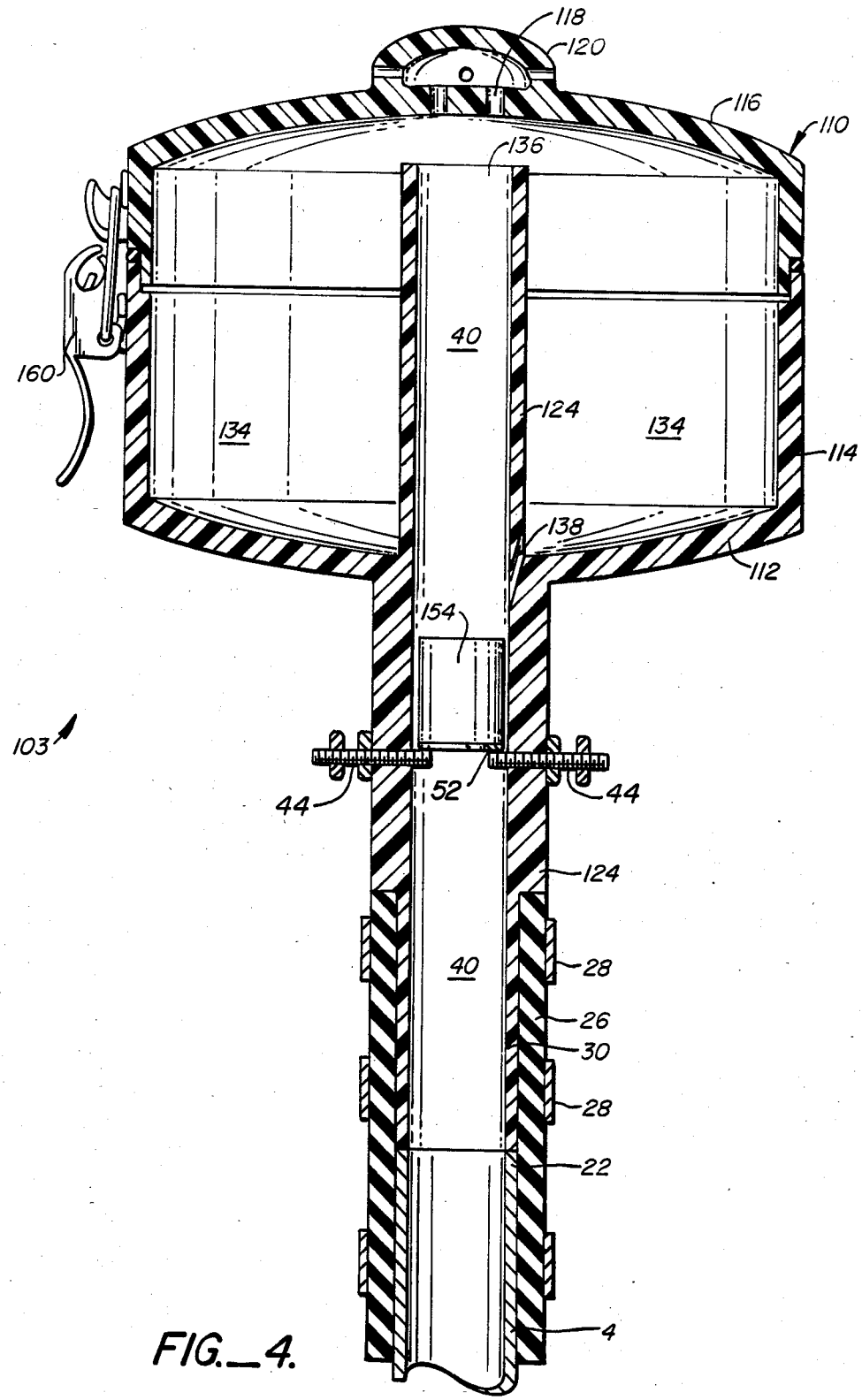
FIG._4.

HYDRAULIC FLUID LEAK WARNING APPARATUS

This is a continuation-in-part of U.S. patent application Ser. No. 420,067, filed Sept. 20, 1982, now abandoned.

BACKGROUND OF THE INVENTION

This invention is related to warning systems, particularly apparatus for quickly signalling when a hydraulic system has sprung a leak.

Many types of equipment use hydraulic systems as the power source for various attachments and for their own component parts. For example, some commercial lawn mowers used to cut the grass on golf course greens use pressurized hydraulic fluid to power the cutting reel and to drive the mower's wheels using individual hydraulic motors at each wheel. One problem with hydraulic systems, which is particularly acute with golf course green lawn mowers, is that if the system springs a leak much damage can be done to the golf green by the hot hydraulic fluid before the operator notices the leak.

There are many types of low fluid level warning systems presently available that can be used to alert the operator of a leak in the system. Such sensors commonly detect when the fluid level drops below a set level. Since hydraulic fluid heats up and expands during use, the reservoir fluid level also rises during use. Therefore the set level must be set at a point below the lowest operating level when the fluid is still cool. If the hydraulic system springs a leak while the hydraulic fluid is cool, the sensor will drop below the set level relatively quickly. However, if the leak occurs after the fluid has heated up and expanded during use, a rather large quantity of hydraulic fluid will be lost before the system provides its warning. With slow or moderate leaks this may or may not be catastrophic for a golf course because the fluid would be spread over a large area. However, if a fast leak occurs on a golf green, a substantial volume of hot hydraulic fluid can be deposited in a relatively small area. This can lead to the destruction of a green, which represents a very expensive loss.

SUMMARY OF THE INVENTION

The present invention is directed to apparatus for warning of a leak in a hydraulic system. The warning apparatus includes a liquid level sensor mounted to the upper end of a riser pipe extending from the reservoir of the hydraulic system. The liquid level sensor includes a vented expansion chamber having a bottom, a circumferential sidewall and a top. A float chamber pipe is mounted to the top of the riser pipe and extends into the interior of the expansion chamber. The interior of the float chamber pipe defines a float chamber. The float chamber pipe has one or more overflow openings positioned a substantial distance above the bottom of the expansion chamber. The openings are positioned so the excess volume of hydraulic fluid, created when the equipment is started up, flows through the openings and into the expansion chamber where it is contained or trapped.

A float is positioned in the float chamber and rises and falls with the rise and fall of the level of the hydraulic fluid in the float chamber. The float acts as the sensing element in a warning circuit to indicate when the fluid level in the float chamber drops below a predetermined level. If the hydraulic system springs a leak the float needs to drop only a short distance before the warning signal is produced since the excess volume of fluid is trapped in the expansion chamber. Thus the equipment operator is given a prompt warning of any leak in the hydraulic system so damage can be minimized.

The trapped fluid in the expansion chamber can be allowed to drain back into the reservoir, typically through the riser pipe, before re-starting the equipment in two different ways. The first way uses an active drainback system which requires intervention of the user. The second uses a passive drainback system. Both are described below.

The passive drainback system includes a relatively small diameter constricting passageway connecting the bottom of the expansion chamber with the reservoir. For example, a constricting passageway may be formed through the wall of the float chamber pipe near or at the bottom of the expansion chamber. Upon start up of the equipment the excess volume of hydraulic fluid would flow into the expansion chamber through the overflow openings at the top of the float chamber pipe; a small amount would also flow into the expansion chamber through the constricting passageway. After the equipment sits idle, which allows the hydraucic fluid to cool and contract, the hydraulic fluid seeps through the passageway and back into the reservoir without operator intervention.

If a moderate or slow leak occurs, so that the leak is about at the rate of flow of hydraulic fluid through the constricting passageway, the liquid level in the float chamber will follow the liquid level in the expansion chamber. In such a case the float will actuate the signal assembly only when the liquid level of the warning device has been reduced to the predetermined level. However, if the hydraulic system suddenly springs a fast leak, the liquid level in the float chamber quickly drops to the predetermined level so the float actuates the signal assembly. This occurs because with a fast leak the flow of fluid through the passageway is not fast enough to immediately replace all of the oil flowing out of the float chamber.

Although this passive system has the disadvantage of permitting the excess volume of hydraulic fluid to leak out before signalling the operator when a slow leak occurs, the leaked hydraulic fluid is usually spread over a large area so damage is often minimized.

Although the passive drainback system can work well, it has been found that seasonal temperature changes affect its operation. A constricting passageway sized to work well in summer has been found to be too small for proper operation during late fall and early spring, and vice versa. Therefore, if the passive drainback system is used the constricting passageway must be variable in cross-sectional area according to the ambient temperature. This variable area can be provided in several ways. For example, a user manipulated valve can be placed along the passageway. Alternatively several constricting passageways of different diameters can be provided with all but a chosen one being plugged at any one time.

The active drainback system permits the expansion chamber to drain only upon some positive act by the user. For example, one could mount the portion of the float chamber pipe within the expansion chamber by threads and extend the float chamber pipe past the top of the expansion chamber. The user would then unscrew and remove the float chamber pipe allowing the hydraulic fluid trapped in the expansion chamber to flow back into the reservoir.

An advantage of the active drainback system over the passive system is that the operator gets a prompt indication of any leak, fast or slow, after only a small amount, for example six ounces or less, of hydraulic fluid has been lost. This can be contrasted with the loss of 32-48 ounces of hydraulic fluid (which represents the excess volume) which occurs before the warning signal is produced by a slow leak when the passive drainback system is used. Active drainback systems, since user intervention is required, help to remind the operator to check the hydraulic fluid level before use.

In the preferred embodiment, a pair of electric terminals, coupled to a signal device, extend into the float chamber. The float has a metal rim on its bottom. When the liquid in the float chamber drops below a predetermined level, the metal rim contacts the terminals to complete an electric circuit allowing a warning signal to be produced by the signal assembly.

The warning apparatus is of simple and inexpensive yet rugged construction. It can be used with many different types of hydraulically powered equipment with the need for very little modification.

Other features and advantages of the present invention will appear from the following description in which the preferred embodiment has been set forth in detail in conjunction with the accompanying drawing.

BRIEF DESCRIPTION OF THE DRAWINGS

FIG. 1 is a schematic representation of a first embodiment the leak warning apparatus of the invention including an active drainback system and shown mounted to a hydraulic fluid reservoir of a golf course mower.

FIG. 2 is a side cross-sectional view of the liquid level sensor of the warning apparatus of FIG. 1.

FIG. 3 is a schematic representation of a second embodiment the leak warning apparatus of the invention including a passive drainback system and shown mounted to a hydraulic fluid reservoir of a golf course mower.

FIG. 4 is a side cross-sectional view of the liquid level sensor of the warning apparatus of FIG. 3.

DETAILED DESCRIPTION OF THE PREFERRED EMBODIMENTS

Turning to FIG. 1, a first embodiment of the hydraulic fluid leak warning apparatus 2 of the invention includes broadly a liquid level sensor 3 and a warning signal assembly 5. Sensor 3 is shown mounted to a reservoir riser pipe 4 to fluidly connect sensor 3 with a hydraulic fluid reservoir 6 on a golf course mower 8.

Referring now to FIG. 2, sensor 3 includes an expansion chamber 10 having a bottom 12, a cylindrical, circumferential sidewall 14 and a top 16. Expansion chamber 10 is supported on the upper end 22 of riser pipe 4 by a connecting pipe 24. A section of flexible hose 26 and hose clamps 28 secure the lower end 30 of pipe 24 to the upper end 22 of riser pipe 4.

A float chamber pipe 31 extends upwardly into and through the interior 34 of expansion chamber 10. Pipe 31 passes through an opening 33 in top 16 and has vented cap 35 at its upper end. Pipe 31 has openings 36 positioned a substantial distance above bottom 12. Openings 36 connect the interior 40, also called float chamber 40, of pipes 31 and 24 with interior 34 of expansion chamber 10.

An elongate float 42 is loosely mounted within float chamber 40 between a pair of electrical terminals 44 and openings 36. Terminals 44 extend through the wall of connecting pipe 24 and are connected in series with a battery 46, a buzzer 48 and an arming switch 50 as shown in FIG. 1. Float 42 has a metal ring 52 mounted to its lower edge so that when ring 52 contacts electrical terminals 44, buzzer 48 sounds when arming switch 50 is closed.

Assuming mower 8 has not been used for a while, such as at the beginning of the day, the fluid in reservoir 6 is relatively cool and contains little air so that it is in a unexpanded state. The operator first grasps cap 35 to unscrew pipe 31 from bottom 12 of chamber 10 and removes pipe 31. The operator then removes float 42 and adds hydraulic fluid if needed, typically to a fill line 54. Float 42 and pipe 31 are then reinserted into chamber 34 and pipe 31 is threaded to bottom 12. Float 42, being quite buoyant, rises to the dashed line position of FIG. 2. Mower 8 is then started which causes hydraulic fluid from reservoir 6 to heat up and expand, primarily by the normal aeration of the hydraulic fluid. This extra volume of hydraulic fluid flows up float chamber 40 through the annular region 56 between float 42 and pipe 31. Because annular region 56 is relatively small, the excess hydraulic fluid quickly moves up float chamber 40 and flows out of openings 36 into interior 34 of expansion chamber 10 where it is held.

While operating, since the hydraulic fluid remains warm and agitated, float 42 remains floating above terminals 44. However, if a leak occurs in the hydraulic system, hydraulic fluid is drained from float chamber 40 which causes float 42 to drop. As the fluid in float chamber 40 drops, float 42 drops until ring 52 rests on terminals 44. This occurs after only a small volume of hydraulic fluid has been lost. This is a significant improvement over prior art sensors in which a volume of liquid equal to the increase in volume of the hydraulic fluid would need to be lost before the float would drop far enough to signal the leak. In fact, it has been found that this first embodiment of the present invention is sensitive enough so that during a 10 or 15 minute break, the hydraulic fluid can cool down sufficiently to cause the fluid level in float chamber 40 to drop enough to lower float 42 onto terminals 44 thus sounding buzzer 48. This, of course, can be eliminated by opening arming switch 50 when mower 8 is not in use. However, once the mower 8 is restarted, the volume of hydraulic fluid quickly heats up and expands to its prior state, thus refloating float 42.

After use the hydraulic fluid held within interior 34 is drained back into reservoir 6 through pipe 24 and riser 4 by removing pipe 31. Thus, sensor 3 is provided with an active drainback system in which the excess volume of hydraulic fluid remains within expansion chamber 34 until someone actively does something to allow it to drain back into reservoir 6. Other structures for selectively fluidly connecting the bottom of expansion chamber 34 with reservoir 6 could also be used. For example, a separate valved passageway between the bottom of interior 34 and either the interior of connecting pipe 24 or fluid reservoir 6 may be provided. However, applicant has found it advantageous to require the operator to remove float chamber pipe 31 and float 42 before starting mower 8. Doing so acts as a reminder to check the hydraulic fluid level and top off if needed.

Turning now to FIG. 3, a second embodiment of hydraulic fluid leak warning apparatus 102 of the invention is shown to include broadly a liquid level sensor 103 and a warning signal assembly 5. Sensor 103 is shown mounted to a reservoir riser pipe 4 to fluidly connect sensor 103 with a hydraulic fluid reservoir 6 on a golf course mower 8.

Referring also to FIG. 4, sensor 103 includes an expansion chamber housing 110 having a bottom 112, a cylindrical, circumferential sidewall 114 and a removable top 116. Top 116 has vent holes 118 covered by a vented cap 120. Housing 110 is supported on the upper end 22 of riser pipe 4 by a float chamber pipe 124. A section of flexible hose 26 and hose clamps 28 secure the lower end 30 of pipe 124 to the upper end 22 of riser pipe 4.

Float chamber pipe 124 extends upwardly into the expansion chamber 134 within expansion chamber housing 110. Pipe 124 has an open top 136 positioned a substantial distance above bottom 112. A constricting passageway 138 is formed through the wall of pipe 124 adjacent bottom 112. Passageway 138 provides a narrow fluid path between the interior 140, also called the float chamber 40, of float chamber pipe 124 and expansion chamber 134.

When mower 108 has been idle for some time, so that the hydraulic fluid is cool, the level of the fluid in expansion chamber 134, and thus float chamber 140, is at a low point. After mower 108 has run for a while, the hydraulic fluid heats up and becomes agitated so that the levels of the hydraulic fluid within float chamber 40 rises. Hydraulic fluid passes into expansion chamber 134 both through passageway 138 and by overflowing open top 136.

Signal assembly 5 alerts the operator when the hydraulic system of mower 8 has sprung a leak. Assembly 5 includes a pair of electrical terminals 44 extending through the wall of float chamber pipe 124 into float chamber 40, a battery 46, an arming switch 50 and a buzzer 48 all connected by appropriate wiring. A float 54 is housed within float chamber 40. Float 154 is sized to fit loosely within chamber 40. Float 154 hariate wiring. A float 54 is housed within float chamber 40. Float 154 is sized to fit loosely within chamber 40. Float 154 has a metal ring 52 along its lower edge. When the hydraulic fluid within float chamber 40 drops sufficiently, float 154 electrically connects electrical terminals 44 through ring 52.

Before use of this second embodiment of the invention, the operator first removes top 116 and checks to insure float 154 is floating just above electrical terminal 44. If it is not, but rather is resting n terminals 44, upon closing switch 50 buzzer 48 will sound alerting the operator that additional hydraulic fluid must be added. This condition will alert the operator that there may be a very slow leak in the system. If float 154 is floating above terminals 44, the operator can test signal assembly 5 by closing switch 50 and manually pushing float 154 down to contact terminals 44. After adding any necessary hydraulic fluid, top 116 is then replaced and secured to sidewall 114 using clamps 160.

During use the hydraulic fluid heats up so that it expands and rises within float chamber 40, passes through constricting passageway 138 and into expansion chamber 134. If a fast leak occurs, the hydraulic fluid within float chamber 40 will be drained into reservoir 6 much faster than fluid within expansion chamber 134 can pass through constricting passageway 138.

Float 154 will quickly drop to contact terminals 44 thus alerting the operator of the leak before very much hydraulic fluid has been lost. The operator then can shut down the mower and remove it to a place where the hydraulic fluid will not cause as much damage.

If a relatively slow leak occurs, that is a leak flowing at a rate about equal to or less than the rate of flow through constricting passageway 138, much more hydraulic fluid must be lost before a warning signal is produced compared with the first embodiment described above. Since a slow leak is usually spread over a large area, damage to the turf would be moderate or slight.

Modification and variation can be made to the disclosed embodiments without departing from the subject of the invention as defined in the following claims. For example, signal assembly 5, may be replaced by a variety of mechanical or electrical signal structures, assembly 5, being merely exemplary of the structures possible. Also, a number of constricting passageways, all but one plugged according to the ambient temperature, can be used with the passive drainback system of the second embodiment. Alternatively, a control valve may be used along constricting passageway to compensate for ambient temperature changes with the accompanying viscosity changes.

I claim:

1. A hydraulic fluid leak detector for use with hydraulically powered equipment having a hydraulic fluid reservoir, comprising:
    a housing, defining an expansion chamber therein, mounted above the fluid reservoir, said expansion chamber having a bottom;
    a float chamber, fluidly connected to and between the expansion chamber and the fluid reservoir and extending above the expansion chamber bottom, the float chamber fluidly coupled to said expansion chamber through an overflow opening positioned above the expansion chamber bottom so excess hydraulic fluid which expands upon beginning operation of the equipment flows from the fluid reservoir, through the float chamber, through the overflow opening and into the expansion chamber where it is temporarily contained;
    means for signalling when the fluid in said float chamber is below a predetermined level; and
    means for selectively draining hydraulic fluid from a lower region of said expansion chamber into the reservoir, the hydraulic fluid in said expansion chamber remaining therein until said selectively draining means is actuated.

2. The detector of claim 1 wherein said float chamber includes a float chamber pipe extending into the interior of the expansion chamber.

3. The detector of claim 2 wherein said pipe includes a cylindrical pipe removably mounted to said housing so upon removal of said cylindrical pipe fluid in said expansion chamber can flow back into said fluid reservoir.

4. The detector of claim 2 wherein said float chamber pipe has an upper end passing through an opening in a top of said housing.

5. The detector of claim 4 wherein said pipe includes a vertically disposed cylindrical pipe having a vented cap mounted to the upper end external of said housing and wherein said overflow opening includes a plurality of horizontally aligned, radially oriented holes in said pipe.

6. The detector of claim 1 wherein said sensing means includes a float configured to float in liquid within said float chamber.

7. The detector of claim 1 further comprising means, operably coupled to said sensing means, for signalling when the liquid in said liquid level sensing chamber is below said predetermined level.

8. The detector of claim 1, wherein said signalling means includes a pair of electrical terminals extending into the interior of said float chamber.

9. The detector of claim 8 wherein said terminals lie in the same horizontal plane and wherein said sensing means includes a float and said signalling means includes an electrically conducting element mounted to said float, said conducting element configured to contact said electrical terminals when said conducting element drops to said predetermined level.

10. The detector of claim 9 wherein said float is positioned above said electrical terminals.

11. The detector of claim 8 wherein said sensing means includes a float within said float chamber.

12. Hydraulic fluid leak warning apparatus for use in conjunction with a hydraulic power system including a fluid reservoir, the warning apparatus comprising:
   a hydraulic fluid expansion chamber having a bottom, a sidewall and a top;
   Menas for mounting said expansion chamber above and in fluid communication with the reservoir, said mounting means defining a float chamber therein and including a generally vertical pipe extending through the bottom of said expansion chamber and extending vertically into the interior of said expansion chamber, said pipe having an overflow opening above said bottom;
   a float configured to float in hydraulic fluid in said float chamber;
   means, actuated by said float, for signalling when hydraulic fluid in said float chamber drops below a predetermined level; and
   means for selectively draining a lower region of said expansion chamber into the reservoir.

13. The apparatus of claim 12 wherein said signalling means includes a pair of electrical terminals extending into the interior of said pipe, said terminals being at the same level, and an electrically conductive element mounted to said float, said conducting element configured to contact said electrical terminals when said hydraulic fluid drops below a predetermined level thereby actuating said signalling means.

14. A hydraulic fluid leak detector for use with hydraulically powered equipment having a hydraulic fluid reservoir, comprising:
   a housing, defining an expansion chamber therein, mounted above the fluid reservoir, said expansion chamber having a lower region and a bottom;
   a float chamber, fluidly connected to and between the expansion chamber and the fluid reservoir and extending above the expansion chamber bottom, the float chamber fluidly coupled to said expansion chamber through an overflow opening positioned above the expansion chamber bottom so excess hydraulic fluid which expands upon beginning operation of the equipment flows from the fluid reservoir, through the float chamber, through the overflow opening and into the expansion chamber where it is temporarily contained;
   means for signalling when the fluid in said float chamber is below a predetermined level; and
   drainback means, including a constricting passageway fluidly coupling the lower expansion chamber region and the reservoir, for draining hydraulic fluid from the lower expansion chamber region into the reservoir.

15. A hydraulic fluid leak signalling method for use with hydraulically powered equipment having a hydraulic fluid reservoir, comprising the following steps:
   directing excess hydraulic fluid, which is created by the expansion of the hydraulic fluid during operation of the equipment, from the reservoir into a sensing chamber, the sensing chamber having an overflow opening;
   discharging the excess hydraulic fluid through the overflow opening;
   capturing the excess hydraulic fluid from the overflow opening in an expansion chamber;
   monitoring the amount of hydraulic fluid in the sensing chamber;
   signalling when the amount of hydraulic fluid in the sensing chamber is less than a predetermined amount; and
   selectively returning the captured excess hydraulic fluid from the expansion chamber to the reservoir.

* * * * *